(12) United States Patent
Shirasaki

(10) Patent No.: US 11,046,041 B2
(45) Date of Patent: Jun. 29, 2021

(54) DECORATIVE SHEET, EMBOSS PROCESSING METHOD AND EMBOSS PROCESSING MOLD

(71) Applicant: SEIREN CO., LTD., Fukui (JP)

(72) Inventor: Tatsuya Shirasaki, Fukui (JP)

(73) Assignee: SEIREN CO., LTD.

( * ) Notice: Subject to any disclaimer, the term of this patent is extended or adjusted under 35 U.S.C. 154(b) by 68 days.

(21) Appl. No.: 16/164,218

(22) Filed: Oct. 18, 2018

(65) Prior Publication Data

US 2019/0118505 A1 Apr. 25, 2019

(30) Foreign Application Priority Data

Oct. 19, 2017 (JP) .............................. JP2017-203003

(51) Int. Cl.
*B32B 3/30* (2006.01)
*B29C 59/02* (2006.01)
(Continued)

(52) U.S. Cl.
CPC .............. *B32B 3/30* (2013.01); *B29C 59/026* (2013.01); *B29C 59/046* (2013.01);
(Continued)

(58) Field of Classification Search
CPC .... B32B 3/30; B32B 3/02; B32B 3/26; B32B 3/263; B32B 3/28; B32B 2307/56; B32B 2451/00; B29C 59/026; B29C 59/043; Y10T 428/24479; Y10T 428/24496; Y10T 428/24504; Y10T 428/24512; Y10T 428/24537; Y10T 428/24545; Y10T 428/24554; Y10T 428/2457;
(Continued)

(56) References Cited

U.S. PATENT DOCUMENTS 3,629,035 A * 12/1971 Kuroda ................... B32B 27/00
428/158
4,393,116 A * 7/1983 Taylor ..................... B29C 70/40
428/343
(Continued)

FOREIGN PATENT DOCUMENTS

JP 2005261581 A 9/2005
JP 2007276285 A 10/2007
(Continued)

*Primary Examiner* — Megha M Gaitonde
(74) *Attorney, Agent, or Firm* — Lerner, David, Littenberg, Krumholz & Mentlik, LLP

(57) ABSTRACT

In a decorative sheet, a concavo-convex pattern is provided on a surface of a base material. The concavo-convex pattern includes a first concave, a convex and a second concave. The first concave is a bottomed concave. The convex is adjacent to the first concave. The second concave opens at the bottom surface of the first concave. The second concave is a bottomed concave. The second concave is provided in a first region of the bottom surface of the first concave which is a region spaced apart from a boundary between the first concave and the convex not less than a maximum dimension which is a dimension in an opening direction orthogonal to a thickness direction of an opening end of the second concave which is a side of the bottom surface of the first concave in the thickness direction of the base material.

12 Claims, 7 Drawing Sheets

(51) Int. Cl.
*B29C 59/04* (2006.01)
*B29K 67/00* (2006.01)

(52) U.S. Cl.
CPC ..... *B29K 2067/003* (2013.01); *B32B 2307/56* (2013.01); *B32B 2451/00* (2013.01)

(58) Field of Classification Search
CPC ..... Y10T 428/24603; Y10T 428/24612; Y10T 428/24942; Y10T 428/2495
USPC ....... 428/156, 158, 159, 130, 163, 164, 165, 428/167, 171, 212, 213
See application file for complete search history.

(56) References Cited

U.S. PATENT DOCUMENTS

| | | | | | |
|---|---|---|---|---|---|
| 4,561,917 | A | * | 12/1985 | Urai | B68G 7/00 |
| | | | | | 156/73.1 |
| 2004/0185247 | A1 | * | 9/2004 | Fenton | B32B 5/18 |
| | | | | | 428/327 |
| 2009/0267401 | A1 | * | 10/2009 | Ito | B60N 2/70 |
| | | | | | 297/452.58 |
| 2014/0052041 | A1 | * | 2/2014 | Barberio | A61F 13/0209 |
| | | | | | 602/48 |
| 2017/0334127 | A1 | | 11/2017 | Kitano et al. | |

FOREIGN PATENT DOCUMENTS

| | | |
|---|---|---|
| JP | 5913755 B1 | 5/2016 |
| JP | S1561835 | 10/2016 |

* cited by examiner

DECORATIVE SHEET, EMBOSS PROCESSING METHOD AND EMBOSS PROCESSING MOLD

CROSS-REFERENCE TO RELATED APPLICATION

This application claims priority from Japanese Patent Application No. 2017-203003 filed Oct. 19, 2017. The entire content of the priority application is incorporated herein by reference.

BACKGROUND OF THE INVENTION

Technical Field

The present disclosure relates to a decorative sheet, an embossing processing method for manufacturing a decorative sheet, and an embossing processing mold for manufacturing a decorative sheet.

Techniques related to decorative sheets have been proposed. For example, in Japanese Patent Application Laid-Open No. 2007-276285, a seat skin material of a vehicle is disclosed. The seat skin material has an uneven pattern. The seat skin material is manufactured in the following way. That is, according to the method for manufacturing the seat skin material, a laminated sheet passes under the condition that the laminated sheet is pressed between an embossing roll and a heat roll. The laminated sheet is formed by laminating and integrating an outer material and a base material serving as a cushion layer, or by laminating and integrating an outer material and a fibrous base material. The temperature of the embossing roll is set to 100 to 250° C. The temperature of the heat roll is set to 100 to 250° C. The processing speed is set to 0.3 to 10 m/min. This manufacturing method can also be carried out by placing a calendar roll on a side opposite to the heat roll so as to be in contact with the embossing roll. The laminated sheet is in contact with the embossing roll ½ circumference.

In Japanese Patent No. 5913755, a seat skin material is disclosed. The seat skin material is formed by imparting an embossed pattern to a surface of an elongated material. A manufacturing method includes a process of pressing the elongated material. In this process, the elongated material passes between an embossing roll and a flat roll. The embossing roll is provided with a plurality of embossing portions protruding from a base surface. When the elongated material passes between the embossing roll and the flat roll, an outer material, a lining material and a cushioning material are thermally fused to each other by heating and pressing of the embossing portions. Furthermore, since the embossing roll and the flat roll are both heated, the outer material and the lining material are thermally fused with the cushioning material. In the cushioning material, a portion to be thermally fused is compressed. A concave portion is formed on an outer material side of the seat skin material by heating and pressing the embossing portions. On a lining material side of the seat skin material, a concave portion is formed at a position corresponding to the concave portion of the outer material. By the emboss process, the seat skin material having an embossed pattern with a plurality of recessed portions formed on each surface of the outer material and the lining material is formed.

In Japanese Patent Application Laid-Open No. 2005-261581, a seat sheet material is disclosed. The seat sheet material is a skin material alone or a laminate body including a skin material. The seat sheet material has a concavo-convex shape on a front surface side of the skin material. The concavo-convex shape is formed by hot press molding. The concave portion has fine unevenness on a bottom surface. As a result, the bottom surface of the concave portion becomes glossless and matte. The bottom surface of such a concave portion is formed by hot press molding using a hot press mold. In the hot press mold, fine irregularities are provided to a front surface of an embossing portion. In the hot press mold, fine irregularities are provided by the sand blast method.

In addition, the applicant of the present application proposes the following leather material in Japanese Design Patent No. 1561835. That is, the leather material includes a small-width thin-wall portion. A plurality of thin-wall portions are formed at irregular intervals in the leather material. In the thin-wall portions, dot-like concave portions are formed throughout the entirety.

SUMMARY

According to one aspect, this specification discloses a decorative sheet which includes a base material, and a concavo-convex pattern provided on a front surface of the base material, wherein the concavo-convex pattern including, a first concave portion having a bottom surface whose depth direction coincides with a thickness direction of the base material, a convex portion which is adjacent to the first concave portion and whose height direction coincides with the thickness direction, and a second concave portion having a bottom surface which opens at the bottom surface of the first concave portion and whose depth direction coincides with the thickness direction, wherein the second concave portion is provided in a first region of the bottom surface of the first concave portion which is a region spaced apart from a boundary between the first concave portion and the convex portion not less than a maximum dimension which is a dimension in an opening direction orthogonal to the thickness direction of an opening end of the second concave portion which is a side of the bottom surface of the first concave portion in the thickness direction.

According to another aspect, this specification also discloses an emboss processing method which includes, an embossing process which forms a concavo-convex pattern to a front surface of a base material, wherein the embossing process including, a first concave portion process which forms a first concave portion having a bottom surface which is included in the concavo-convex pattern and whose depth direction coincides with a thickness direction of the base material, a convex portion process which forms a convex portion which is included in the concavo-convex pattern and which is adjacent to the first concave portion and whose height direction coincides with the thickness direction, and a second concave portion process which forms a second concave portion having a bottom surface and which is included in the concavo-convex pattern and which opens at the bottom surface of the first concave portion and whose depth direction coincides with the thickness direction, wherein the second concave portion process is a process to form the second concave portion in a first region of the bottom surface of the first concave portion which is a region spaced apart from a boundary between the first concave portion and the convex portion not less than a maximum dimension which is a dimension in an opening direction orthogonal to the thickness direction of an opening end of the second concave portion which is a side of the bottom surface of the first concave portion in the thickness direction, and wherein the second concave portion process is carried out together with the first concave portion process.

According to still another aspect, this specification also discloses an emboss processing mold which includes, a molding portion which contacts a front surface of a base material and has a concavo-convex shape which corresponds to a concavo-convex pattern which is formed on the front surface of the base material, wherein the molding portion including, a first mold portion having a convex shape which corresponds to a first concave portion having a bottom surface which is included in the concavo-convex pattern and whose depth direction coincides with a thickness direction of the base material, a second mold portion having a concave shape which corresponds to a convex portion which is included in the concavo-convex pattern and which is adjacent to the first concave portion and whose height direction coincides with the thickness direction, and a third mold portion having a convex shape which corresponds to a second concave portion having a bottom surface which is included in the concavo-convex pattern and which opens at the bottom surface of the first concave portion and whose depth direction coincides with the thickness direction, wherein the third mold portion is provided in a second region of a top surface of the first mold portion which is a region spaced apart from an outer edge portion of the top surface of the first mold portion corresponding to a boundary between the first concave portion and the convex portion not less than a maximum dimension which is a dimension in a direction along the top surface of the first mold portion at a rear end of the third mold portion which is a side of the top surface of the first mold portion.

In a decorative sheet, a concavo-convex pattern is provided on a front surface of a base material. The decorative sheet is used as an outer material of various products. It may be necessary to differentiate the decorative sheet from competing products of other companies. In such cases, for example, a decorative sheet different from a known decorative sheet is required in terms of design properties. Therefore, the inventor examined a new decorative sheet having a different concavo-convex pattern from the known decorative sheet. At that time, the inventor considered to adopt emboss processing as a manufacturing method for forming a concavo-convex pattern on a surface of a base material.

In view of the foregoing, it is an object of the present disclosure to provide a new decorative sheet as an outer material of a predetermined product, an emboss processing method for manufacturing a decorative sheet and an emboss processing mold for manufacturing a decorative sheet.

DETAILED DESCRIPTION

Figure 1:
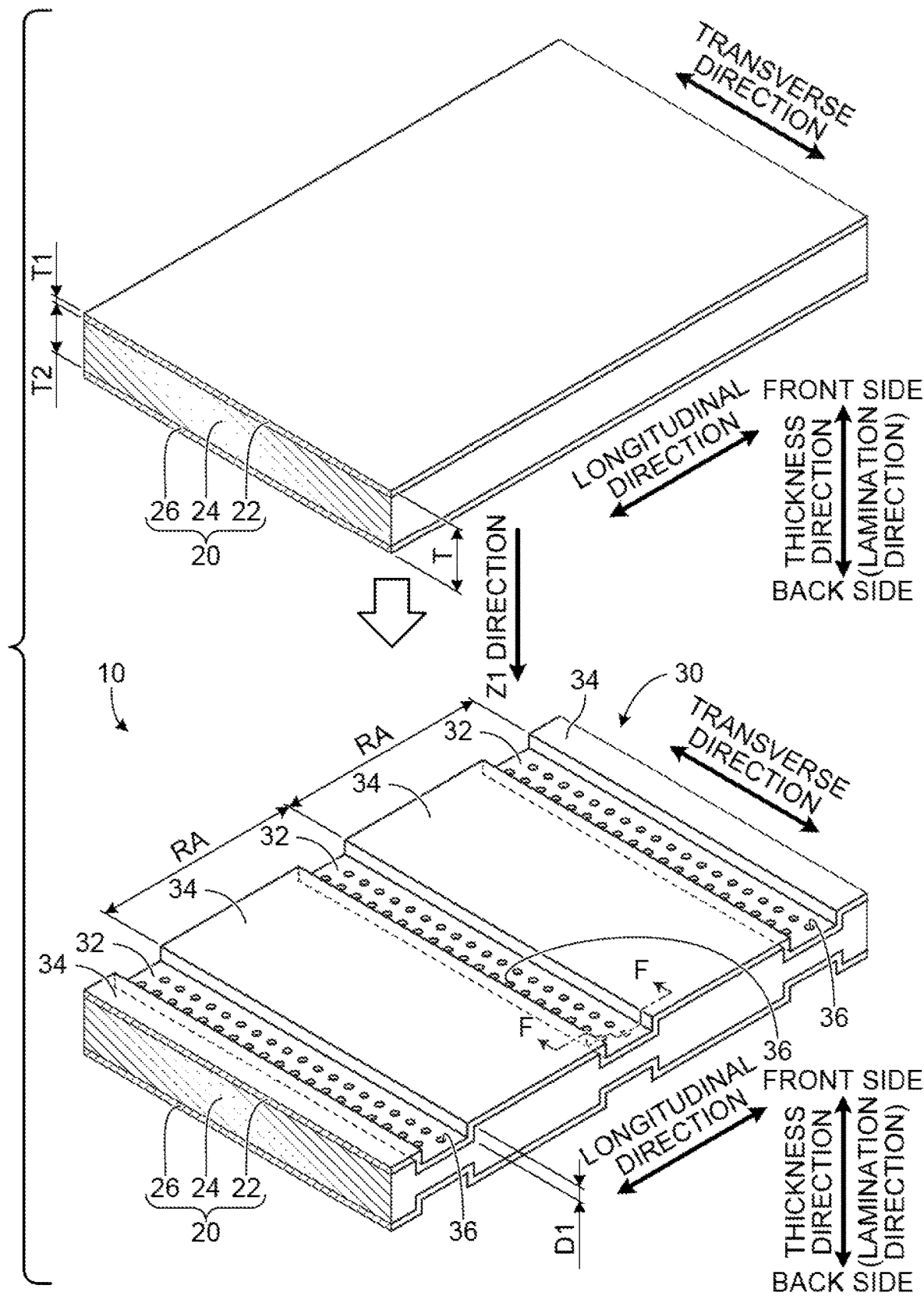
FIG. 1 is a perspective view showing an example of schematic configurations of a base material and a decorative sheet. The upper row shows the base material before emboss processing. The lower row shows the decorative sheet after emboss processing.

Embodiments for carrying out the present disclosure will be described with reference to the drawings. The present disclosure is not limited to the configurations described below, and various configurations can be employed based on the same technical idea. For example, a part of the configurations shown below may be omitted or may be replaced by another configuration or the like. Another configuration may be included.

Each drawing of the embodiment schematically shows predetermined configurations. Therefore, in each drawing of the embodiment, correspondence with another drawing or correspondence with a numerical value to be described later specifying the configuration in the drawing may not be accurate in some cases. In each drawing of the embodiment, hatching indicates a cross section.

<Decorative Sheet>

A decorative sheet 10 will be described with reference to FIGS. 1 to 3. The decorative sheet 10 includes a base material 20 and a concavo-convex pattern 30. In the decorative sheet 10, the concavo-convex pattern 30 is provided on a front surface of the base material 20. In the embodiment, the decorative sheet 10 and the base material 20 are elongated sheet materials. The concavo-convex pattern 30 is formed on the front surface of the base material 20 by carrying out an emboss processing method by an emboss processing apparatus 50. The emboss processing apparatus 50 and the emboss processing method will be described later. A longitudinal direction of the base material 20 is the longitudinal direction of the decorative sheet 10, and a transverse direction of the base material 20 is the transverse direction of the decorative sheet 10. Accordingly, in the embodiment, the longitudinal direction of the decorative sheet 10 and the base material 20 is simply referred to as "longitudinal direction" and the transverse direction of the decorative sheet 10 and the base material 20 is simply referred to as "transverse direction" (see FIG. 1). The longitudinal direction and the transverse direction are orthogonal to each other.

As the base material 20, various sheet materials are adopted. For example, various sheet materials having different thicknesses are adopted as the base material 20. The base material 20 is a laminate body having two or more layers. In this case, the decorative sheet 10 is also a laminated body which has the same number of laminations as the base material 20. In the embodiment, the base material 20 is a three-layer laminate body having a first sheet 22, a second sheet 24 and a third sheet 26 (see the upper row of FIG. 1). Furthermore, the base material 20 has cushioning properties. In this case, the decorative sheet 10 is also a three-layer laminate body having cushioning properties (see the lower row of FIG. 1). However, the base material may be a laminate body of two layers or four or more layers. For example, when the base material is a laminate body of two layers, this base material may be a laminate body including the first sheet 22 and the second sheet 24.

In the embodiment, in a thickness direction, the side on which the first sheet 22 is provided is referred to as "front side". In the thickness direction, the side on which the third sheet 26 is provided is referred to as "back side". The thickness direction coincides with the direction in which the first sheet 22, the second sheet 24 and the third sheet 26 are laminated on the base material 20. For each sheet material of the base material 20, the first sheet 22, the second sheet 24 and the third sheet 26, front surfaces are the surfaces which are on the front side in the thickness direction and back surfaces are the surfaces which are on the back side in the thickness direction. By the emboss process, the front surface of the base material 20 becomes the front surface of the decorative sheet 10 and the back surface of the base material 20 becomes the back surface of the decorative sheet 10. That is, in the state of the decorative sheet 10, the front surface of the decorative sheet 10 and the front surface of the base material 20 means the same surface. Similarly, in the state of the decorative sheet 10, the back surface of the decorative sheet 10 and the back surface of the base material 20 means the same surface. For example, when the decorative sheet 10 serves as an outer material of an interior article for a vehicle, the front surface of the decorative sheet 10 will become the front surface of the aforementioned interior article. A user of the vehicle visually recognizes the front surface of the decorative sheet 10 forming the front surface of the interior article.

A thickness T (see the upper row of FIG. 1) of the base material 20 is appropriately determined in consideration of various conditions. However, preferably, the thickness T of the base material 20 is set to a predetermined value in the range of 1.3 to 15.5 mm. As a result, a clear concavo-convex pattern 30 can be formed on the front surface of the base material 20. The base material 20 is formed by bonding the first sheet 22 to the front surface of the second sheet 24 and bonding the third sheet 26 to the back surface of the second sheet 24. Known methods are adopted for bonding the second sheet 24 and the first sheet 22 and bonding the second sheet 24 and the third sheet 26. For example, the aforementioned bonding is performed via an adhesive. In addition, the aforementioned bonding is performed by frame lamination. When comparing the aforementioned two construction methods, the inventor believes that frame lamination is preferable from the viewpoint of process load at the time of manufacturing the base material 20 and weight reduction of the base material 20. Frame lamination is a technology already put into practical use. Therefore, explanation on frame lamination will be omitted.

As the first sheet 22, various sheet materials are adopted. For example, as the first sheet 22, a fibrous sheet material is adopted. As the fibrous sheet material, a woven fabric, a knitted fabric, a nonwoven fabric or a natural leather is exemplified. Natural leather includes split leather. In addition, for example, the following sheet material is adopted as the first sheet 22. The aforementioned sheet material is a sheet material impregnated or laminated with a synthetic resin in a fibrous sheet material. As the sheet materials, artificial leather, synthetic leather or polyvinyl chloride leather is exemplified. A thickness T1 (see the upper row of FIG. 1) of the first sheet 22 is preferably set to a predetermined value in the range of 0.3 to 1.5 mm. Preferably, the thickness T1 of the first sheet 22 is set to a predetermined value in the range of 0.5 to 1 mm. However, the thickness T1 of the first sheet 22 may be different from the aforementioned range. The thickness T1 of the first sheet 22 is appropriately determined in consideration of various conditions.

In the first sheet 22, the fibrous sheet material is preferably a sheet material made of a thermoplastic resin fiber as a material from the viewpoint of processability in emboss processing. As the thermoplastic resin, polyolefin resin, polyester resin, polyamide resin, vinyl chloride resin or polyvinylidene chloride is exemplified. As the polyolefin resin, polyethylene or polypropylene is exemplified. As the polyester resin, polyethylene terephthalate is exemplified. As the polyamide resin, nylon 6 or nylon 66 is exemplified. The fibrous sheet material can be formed from one or more thermoplastic resin fibers selected from the group including the aforementioned plurality of resins.

It is assumed that the first sheet 22 is a sheet material impregnated or laminated with a synthetic resin on a fibrous sheet material. In this case, as the resin to be impregnated or laminated, a known synthetic resin is adopted. As the aforementioned synthetic resin, polyurethane resin or vinyl chloride resin is exemplified. Further, the fibrous sheet material may be colored with known dyes or pigments. Dyes or pigments are appropriately determined in consideration of various conditions.

The second sheet 24 has cushioning properties. Therefore, the base material 20 has cushioning properties as described above. As the second sheet 24, various sheet materials having cushioning properties are adopted. As the sheet material, synthetic resin foam, nonwoven fabric, multilayer woven fabric or multilayer knitted fabric is exemplified. The inventor believes that synthetic resin foams are preferable among the aforementioned sheet materials having cushioning properties from the viewpoint of processability in emboss processing. In particular, the inventor believes polyurethane foam is preferable from the viewpoint of versatility. A thickness T2 (see the upper row of FIG. 1) of the second sheet 24 is preferably set to a predetermined value in the range of 1 to 14 mm.

As the third sheet 26, various sheet materials are adopted. For example, as the third sheet 26, a woven fabric, a knitted fabric or a nonwoven fabric is adopted. In the third sheet 26, basis weight of the sheet material is appropriately determined in consideration of various conditions. For example, when the third sheet 26 is a woven or knitted fabric, the basis weight of the woven or knitted fabric is preferably set to a predetermined value in the range of 10 to 80 g/m2. When the third sheet 26 is a nonwoven fabric, the basis weight of the nonwoven fabric is preferably set to a predetermined value in the range of 10 to 40 g/m2. As like the first sheet 22, the third sheet 26 is preferably a sheet material made of a thermoplastic resin fiber as a material from the viewpoint of processability in emboss processing. As the thermoplastic resin serving as a material, the above-described resin related to the first sheet 22 is exemplified.

Figure 2:
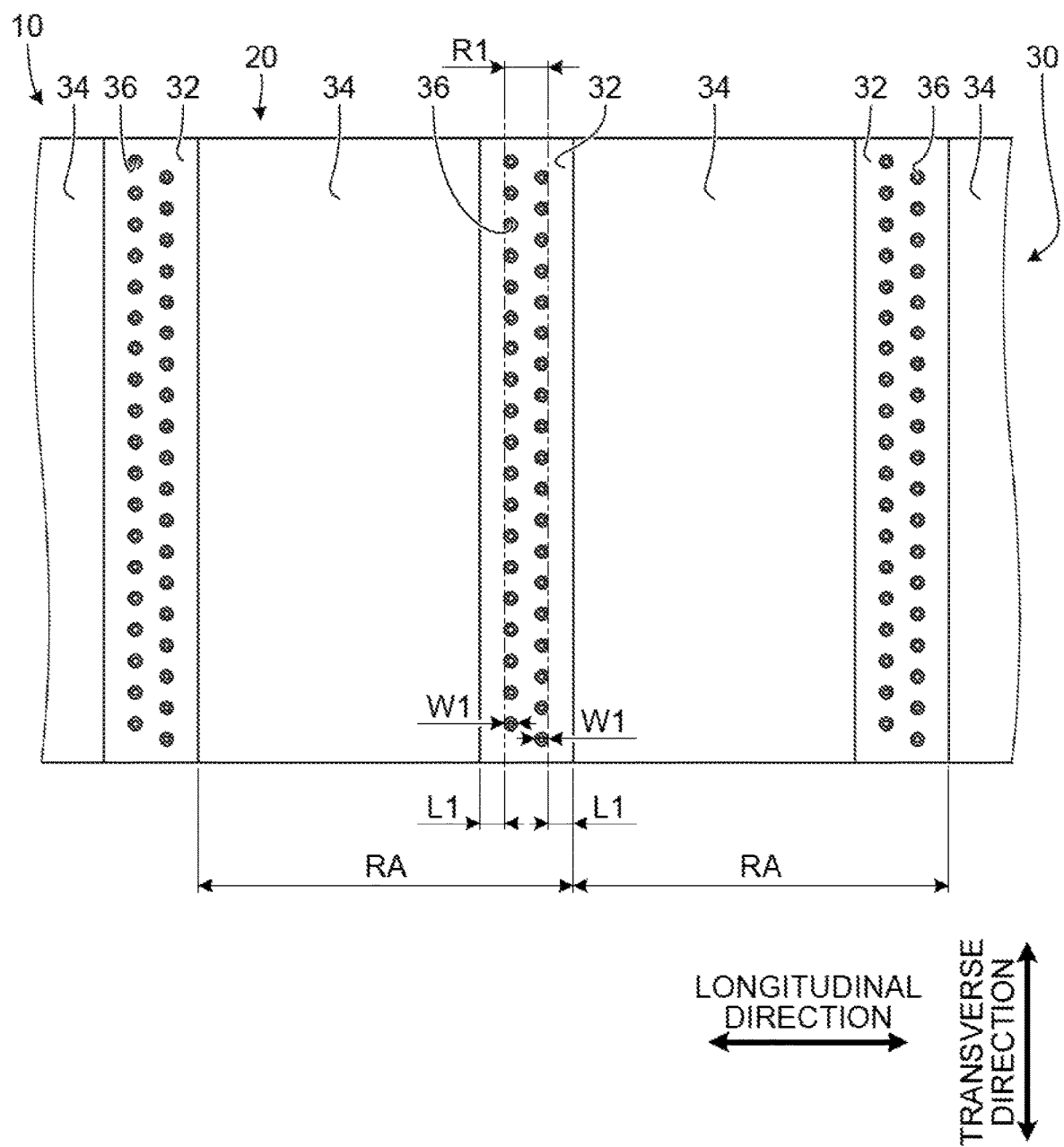
FIG. 2 is a plan view showing an example of a schematic configuration of the decorative sheet and showing the front surface of the decorative sheet shown in the lower row of FIG. 1.
Figure 3:
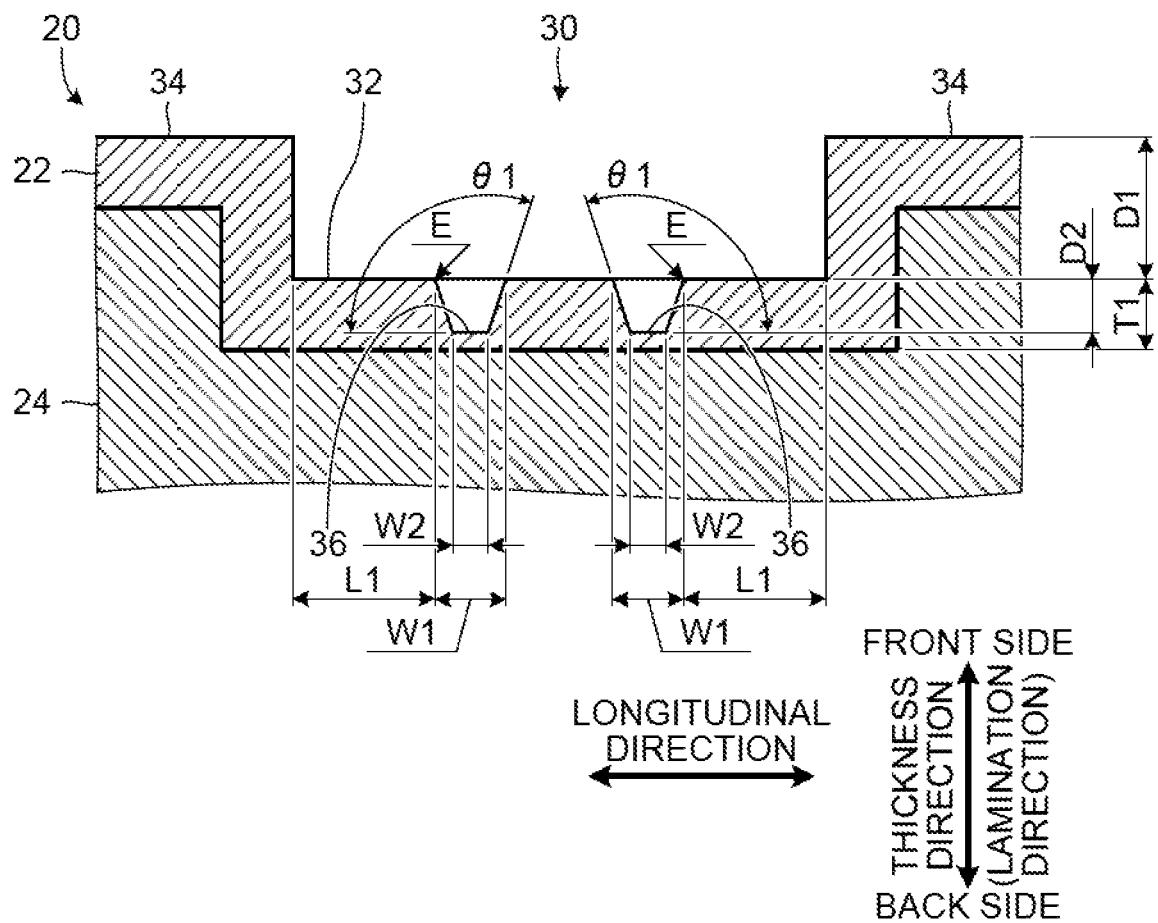
FIG. 3 is a side sectional view showing a schematic configuration of a second concave portion. The cutting position corresponds to the line F-F shown in the lower row of FIG. 1. The base material shows a part in a thickness direction.

The concavo-convex pattern 30 includes a first concave portion 32, a convex portion 34 and a second concave portion 36 (see the lower row of FIG. 1 and FIGS. 2 and 3). The first concave portion 32 is a bottomed concave portion (see the lower row of FIG. 1 and FIG. 3). Furthermore, the first concave portion 32 is a concave portion whose depth direction coincides with the thickness direction. The convex portion 34 is a convex portion which is adjacent to the first concave portion 32 and whose height direction coincides with the thickness direction. The second concave portion 36 is a bottomed concave portion (see FIG. 3). Furthermore, the second concave portion 36 is a concave portion which opens at the bottom surface of the first concave portion 32 and whose depth direction coincides with the thickness direction. The second concave portion 36 is provided in a first region R1 of the bottom surface of the first concave portion 32 (see FIG. 2). The first region R1 is a region of the bottom surface of the first concave portion 32 which is a region spaced apart from a boundary between the first concave portion 32 and the convex portion 34 not less than a maximum dimension W1. The maximum dimension W1 is a maximum dimension in an opening direction of an opening end of the second concave portion 36 on the side of the bottom surface of the first concave portion 32 in the thickness direction (see FIG. 3). The opening direction is orthogonal to the thickness direction. When the opening end of the second concave 36 is circular, the maximum dimension W1 is the diameter of the circle. When the opening end of the second concave 36 is elliptical, the maximum dimension W1 is the major axis of the ellipse. When the opening end of the second concave portion 36 is rectangle, the maximum dimension W1 is the dimension of the diagonal line which becomes longer among the two diagonal lines. In the concavo-convex pattern 30, the relationship between a following distance L1 and the maximum dimension W1 is "distance L1≥maximum dimension W1". The distance L1 is a distance in the longitudinal direction from the boundary between the first concave portion 32 and the convex portion 34 to the second concave portion 36 (see FIG. 2).

In the embodiment, the concavo-convex pattern 30 is a concavo-convex pattern in which a plurality of first concave portions 32 and a plurality of convex portions 34 are alternately repeated in the longitudinal direction (see FIGS. 1 and 2). The first concave portion 32 has a rectangular shape in which the bottom surface traverses the base material 20 in the transverse direction. The convex portion 34 has a rectangular shape in which the top surface traverses the base material 20 in the transverse direction. Furthermore, the concavo-convex pattern 30 is a pattern in which a plurality of second concave portion rows are provided in the longitudinal direction. One second concave portion row is formed by arranging a plurality of second concave portions 36 in the transverse direction. In the concavo-convex pattern 30, the second concave portion row has two rows. The two second concave portion rows are provided so as to be adjacent to each other in the longitudinal direction in a state shifted by a predetermined amount in the transverse direction. The second concave portion 36 is a truncated cone-shaped concave portion which is as the following first aspect and second aspect. In the first aspect, the opening end and the bottom surface are circular shapes. In the second aspect, the bottom surface is parallel to the bottom surface of the first concave portion 32. In the lower row of FIG. 1, and FIG. 2, the following second concave portion is denoted by reference numeral "36". The aforementioned second concave portion is one second concave portion among a plurality of second concave portions 36 provided on the bottom surface of one first concave portion 32.

However, such concavo-convex pattern 30 is an example. In the decorative sheet 10, various concavo-convex patterns are adopted as the concavo-convex pattern 30. The first concave portion 32 and the convex portion 34 and the second concave portion 36 may have shapes different from the above-described shapes. The first concave portion 32 may be a concave portion whose bottom surface is any one of, for example, a circular shape, an elliptical shape, a polygonal shape, a star shape and a flower shape. The convex portion 34 has a shape corresponding to the shape of the first concave portion 32, and forms a space between the plurality of first concave portions 32. The second concave portion 36 may be a concave portion in which the opening end and the bottom surface are any one of, for example, an elliptical shape, a polygonal shape, a star shape and a flower shape.

The first concave portion 32 is preferably a concave portion having a third area of 25 mm2 or more in view of design properties of the concavo-convex pattern 30. By setting the third area to 25 mm2 or more, formation of the second concave portion 36 becomes easy. It is possible to enhance the design properties of the concavo-convex pattern 30. The third area is a sum of a first area and a second area. The first area is an area of the bottom surface of the first concave portion 32 excluding an opening region. The opening region is a region where the second concave portion 36 opens at the bottom surface of the first concave portion 32 (the opening end of the second concave portion 36). The second area is an area of the opening region. It is assumed that a number of N second concave portions 36 are provided on the bottom surface of one first concave portion 32. For one second concave portion 36, the area of the region where the second concave portion 36 opens at the bottom surface of the first concave portion 32 is assumed to be M. In this case, the second area is a product of N and M. Each of the first area, the second area and the third area considers the bottom surface of one first concave portion 32.

The first concave portion 32 is preferably an area ratio of 5 to 60% with respect to a first reference region RA. The aforementioned area ratio is based on the area of each range of the first concave portion 32 and the first reference region RA which can be visually recognized in the following state. The aforementioned state is a state in which the decorative sheet 10 is viewed from above in the thickness direction from the front side (see FIG. 2). The first reference region RA is a region formed by a pair of adjacent first concave portion 32 and convex portion 34 (see the lower row of FIG. 1, and FIG. 2). In the decorative sheet 10, by setting the aforementioned area ratio to 5% or more, it is possible to form the concavo-convex pattern 30 having a three-dimensional effect. By setting the aforementioned area ratio to 60% or less, it is possible to form the convex portion 34 having a height. As a result, the concavo-convex pattern 30 having a three-dimensional effect can be obtained. The two first concave portions 32 adjacent to each other via the convex portion 34 is preferably spaced apart by about twice the thickness T of the base material 20 before emboss processing. Thus, in the decorative sheet 10, it is possible to suppress the occurrence of troubles called "entrainment". It is possible to impart a round feeling and a three-dimensional effect to the concavo-convex pattern 30. The entrainment is a drawback in which the first sheet 22 is pulled toward the bottom surface of the first concave portion 32 at the following portion. The aforementioned portion is a portion of the first concave portion 32 continuing from the top surface of the convex portion 34 to the first concave portion 32.

Depth D1 (see FIG. 3) of the first concave portion 32 is appropriately determined in consideration of various conditions. However, it is preferable that the first concave portion 32 is a concave portion whose depth D1 is set to a predetermined value in the range of 1 to 15 mm. By setting the depth D1 to 1 mm or more, the concavo-convex pattern 30 having a three-dimensional effect can be obtained. By setting the depth D1 to 15 mm or less, it is possible to ensure good processability in the emboss processing method implementation. Productivity of the decorative sheet 10 can be enhanced.

Depth D2 (see FIG. 3) of the second concave portion 36 is preferably 50% or more and less than 100% with respect to the thickness T1 of the first sheet 22. By setting the depth D2 to 50% or more with respect to the thickness T1, the visibility of the second concave portion 36 can be improved. The viewer of the decorative sheet 10 can visually recognize the second concave portion 36. By setting the depth D2 to less than 100% with respect to the thickness T1, the bottom surface of the second concave portion 36 can be included in the first sheet 22. The concavo-convex pattern 30 having preferable design properties can be obtained.

The second concave portion 36 is preferably a concave portion whose maximum dimension W1 is set to a predetermined value in the range of 0.5 to 2 mm. By setting the maximum dimension W1 to 0.5 mm or more, the visibility of the second concave portion 36 can be improved. The viewer of the decorative sheet 10 can visually recognize the second concave portion 36. By setting the maximum dimension W1 to 2 mm or less, the degree of freedom of the following point can be increased. As a result, it is possible to obtain the concavo-convex pattern 30 having preferable design properties. The aforementioned point is the point of arrangement of the second concave portion 36 with respect to the bottom surface of the first concave portion 32. The second concave portion 36 may be a concave portion in which the opening area of the opening end is set to a predetermined value in the range of 0.19 to 3.2 mm2.

The second concave 36 is preferably provided in the first region R1 in a state in which the ratio of the second area to the third area is 5% or more and 35% or less. By setting the aforementioned ratio to 5% or more, it is possible to obtain the concavo-convex pattern 30 having preferable design properties. By setting the aforementioned ratio to 35% or less, the second concave portion 36 having a sharp shape can be formed.

The second concave portion 36 is preferably a concave portion in which an angle θ1 is set to a predetermined value in the range of 90 to 120°. The angle θ1 is an angle between a wall surface of the second concave portion 36 and the bottom surface of the second concave portion 36 (see FIG. 3). By setting the angle θ1 at 90° or more, a corner portion E at the opening end of the second concave portion 36 can have a sharp shape. By setting the angle θ1 at 120° or less, the second concave portion 36 can be made to look like a through hole. The following impression can be given to the viewer of the decorative sheet 10. The aforementioned impression is an impression that the following portion is a pattern including a plurality of through holes. The aforementioned portion is the bottom surface of the first concave portion 32 provided with the plurality of second concave portions 36.

The second concave portion 36 is preferably a concave portion in which the ratio of a maximum dimension W2 to the maximum dimension W1 is set to a predetermined value in the range of 30 to 80%. The maximum dimension W2 is a maximum dimension of the bottom surface of the second concave portion 36 in the opening direction (see FIG. 3). When the bottom surface of the second concave portion 36 is circular, the maximum dimension W2 is the diameter of the circle. When the bottom surface of the second concave portion 36 is elliptical, the maximum dimension W2 is the major diameter of the ellipse. When the bottom surface of the second concave portion 36 is rectangular, the maximum dimension W2 is the dimension of the diagonal which becomes longer among the two diagonal lines. By setting the aforementioned ratio to 30% or more, the corner portion E at the opening end of the second concave portion 36 can have a sharp shape. By setting the aforementioned ratio to 80% or less, the second concave portion 36 can be made to look like a through hole. The following impression can be given to the viewer of the decorative sheet 10. The aforementioned impression is an impression that the following portion is a pattern including a plurality of through holes. The aforementioned portion is the bottom surface of the first concave portion 32 provided with the plurality of second concave portions 36.

<Emboss Processing Apparatus>

The emboss processing apparatus 50 will be described with reference to FIGS. 4 and 5. The emboss processing apparatus 50 is a processing apparatus for manufacturing the decorative sheet 10. The emboss processing apparatus 50 conveys the elongated base material 20 fed out from a supply device 95 and carries out emboss processing to the base material 20 (see FIG. 4). In the emboss processing apparatus 50, emboss processing is performed continuously. After being emboss processed by the emboss processing apparatus 50, the base material 20 is recovered in a recovery device 96 as the decorative sheet 10.

Figure 4:
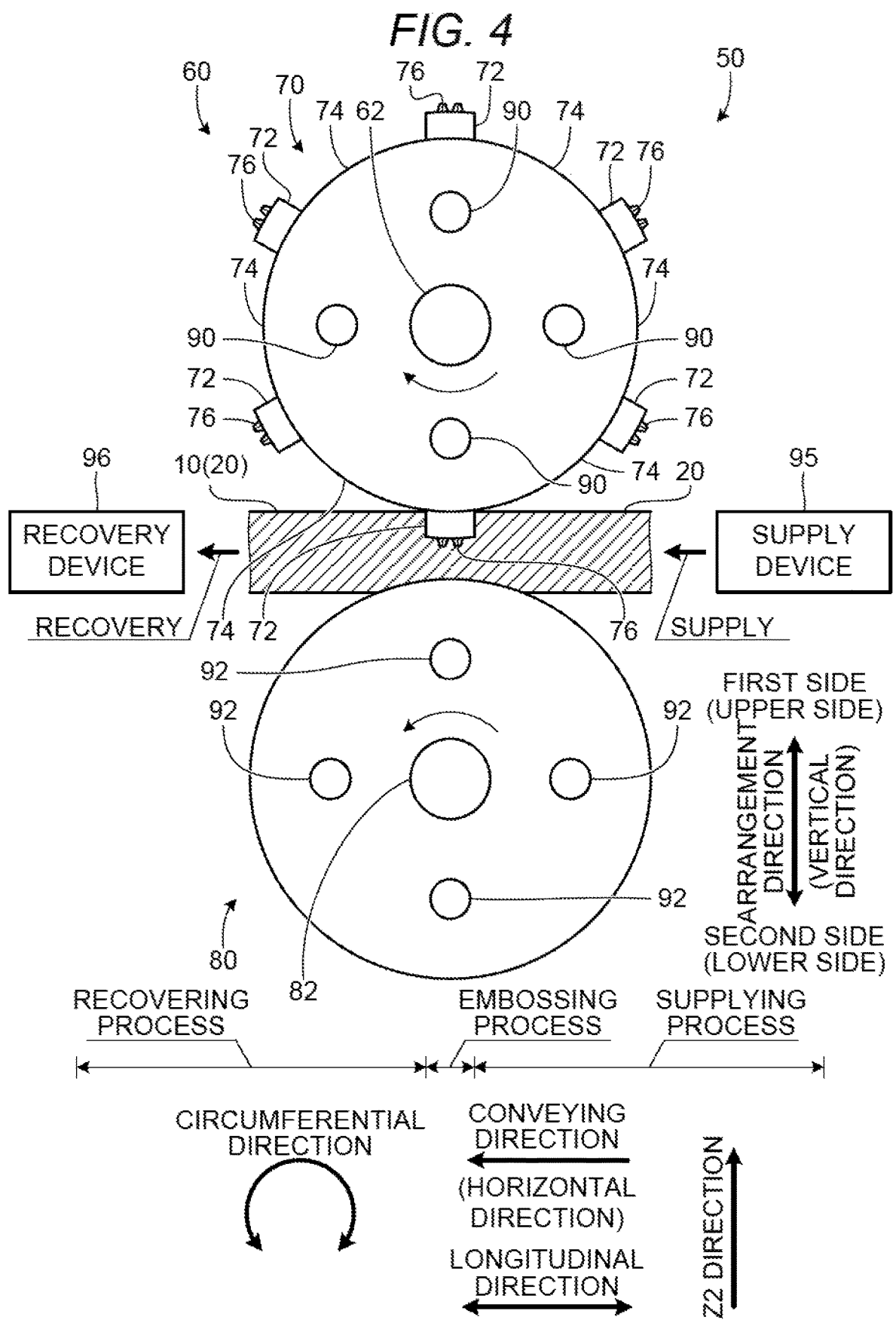
FIG. 4 is a side view showing an example of a schematic configuration of an emboss processing apparatus. An emboss processing mold and an emboss receiving mold have roll shapes. The base material and the decorative sheet show portions corresponding to the emboss processing apparatus.

In FIG. 4, the illustration of the following parts is simplified. Each of the aforementioned parts is the base material 20 and the decorative sheet 10, the supply device 95 and the recovery device 96. The base material 20 and the decorative sheet 10 have an aspect of a continuous elongated sheet material from the supply device 95 to the recovery device 96. As the supply device 95, a supply device provided in a known emboss processing apparatus can be adopted. As the recovery device 96, a recovery device provided in a known emboss processing apparatus can be adopted. Therefore, the descriptions of the supply device 95 and the recovery device 96 will be omitted. In the embodiment, the direction in which the base material 20 and the decorative sheet 10 are conveyed from the supply device 95 to the recovery device 96 is referred to as a "conveying direction". The conveying direction is a direction along the longitudinal direction.

The emboss processing apparatus 50 includes an emboss processing mold 60, an emboss receiving mold 80, and heating portions 90, 92. The emboss processing mold 60 has a roll shape. In this case, the emboss processing mold 60 may be referred to as an emboss roll. The emboss receiving mold 80 has a roll shape. In this case, the emboss receiving mold 80 may be referred to as a receiving roll or a backup roll. The emboss processing mold 60 and the emboss receiving mold 80 are provided side by side in an arrangement direction. The emboss processing mold 60 is provided on a first side in the arrangement direction. The emboss receiving mold 80 is provided on a second side in the arrangement direction. In the embodiment, the arrangement direction is the vertical direction and the conveying direction is the horizontal direction. Further, the first side in the arrangement direction is the upper side in the vertical direction and the second side in the arrangement direction is the lower side in the vertical direction. In this case, the thickness direction (lamination direction) of the base material 20 coincides with the vertical direction. However, the arrangement direction may be a direction different from the vertical direction. The conveying direction may be a direction different from the horizontal direction. The conveying direction is preferably a direction orthogonal to the arrangement direction.

The emboss processing mold 60 rotates in a direction corresponding to the conveying direction with a shaft 62 as a rotation axis. The emboss processing mold 60 is imparted with a driving force from a driving portion. The driving portion is attached to the shaft 62. Accordingly, as aforementioned, the emboss processing mold 60 rotates. In FIG. 4, illustration of the driving portion is omitted. As the driving portion, a motor is exemplified. The following arrow shown in FIG. 4 indicates a rotation direction of the emboss processing mold 60. The aforementioned arrow is an arrow of a single arrow indicated inside the emboss processing mold 60. The emboss processing mold 60 is formed of the same material as a known emboss processing mold. For example, the emboss processing mold 60 is made of metal. As the metal forming the emboss processing mold 60, a steel material is exemplified.

The emboss processing mold 60 includes a molding portion 70. The molding portion 70 has a concavo-convex shape corresponding to the concavo-convex pattern 30. The molding portion 70 is in contact with the front surface of the base material 20 and presses the front surface of the base material 20. The molding portion 70 includes a first mold portion 72, a second mold portion 74 and a third mold portion 76 (see FIGS. 4 and 5). The first mold portion 72 is a convex portion corresponding to the first concave portion 32 of the molding portion 70. The second mold portion 74 is a concave portion corresponding to the convex portion 34 of the molding portion 70. The third mold portion 76 is a convex portion corresponding to the second concave portion 36 of the molding portion 70. The third mold portion 76 is provided in a second region R2 of a top surface of the first mold portion 72 (see FIG. 5). The second region R2 is a region of the top surface of the first mold portion 72 which is a region spaced apart from the following portion not less than a maximum dimension W3. The aforementioned portion is an outer edge portion of the top surface of the first mold portion 72. This outer edge portion is a position corresponding to the boundary between the first concave portion 32 and the convex portion 34 in the top surface of the first mold portion 72. The maximum dimension W3 is a maximum dimension in a following direction of a rear end of the third mold portion 76 (see FIGS. 5 and 6). The rear end of the third mold portion 76 is the end of the third mold portion 76 on the side of the top surface of the first mold portion 72. The aforementioned direction is a direction along the top surface of the first mold portion 72. In the embodiment, the second concave portion 36 is a truncated cone-shaped concave portion as described above. Therefore, the rear end of the third mold portion 76 has a circular shape. In this case, the maximum dimension W3 is the diameter of the circle. Unlike this, when the second concave portion 36 is in a shape of an elliptical frustum, the maximum dimension W3 is the major diameter of the ellipse. When the second concave portion 36 is in a shape of a truncated quadrangular pyramid, the maximum dimension W3 is the dimension of the diagonal line which becomes longer among the two diagonal lines. In the emboss processing mold 60, the relationship between a following distance L2 and the maximum dimension W3 is "distance L2≥maximum dimension W3". The distance L2 is the shortest distance in the aforementioned direction from the outer edge portion of the top surface of the first mold portion 72 to the third mold portion 76 (see FIG. 5).

In the embodiment, the molding portion 70 includes a plurality of first mold portions 72 and a plurality of second mold portions 74 corresponding to the concavo-convex pattern 30 (see FIGS. 1 and 2) of the following aspect mentioned above (see FIG. 4). The aforementioned aspect is an aspect which the plurality of first concave portions 32 and the plurality of convex portions 34 are alternately repeated in the longitudinal direction. Therefore, in the molding portion 70, the plurality of first mold portions 72 and the plurality of second mold portions 74 are alternately repeated in a circumferential direction. In the emboss processing mold 60, the circumferential direction coincides with the rotation direction of the emboss processing mold 60 and the opposite direction thereof (see FIGS. 4 and 5). In the concavo-convex pattern 30, the plurality of second concave portions 36 are arranged on the bottom surface of the first concave portion 32 in the following state. The aforementioned state is a state in which the plurality of second concave portions 36 are arranged in the transverse direction to form the second concave row. Furthermore, the aforementioned state is a state in which the plurality of second concave portion rows are provided in the longitudinal direction. Therefore, the molding portion 70 includes a plurality of third mold portions 76 (see FIG. 5). The plurality of third mold portions 76 are provided at respective positions corresponding to the aforementioned arrangement of the plurality of second concave portions 36 in the second region R2. In FIGS. 4 and 5, the following third mold portion is denoted by reference numeral "76". The aforementioned third mold portion is one third mold portion among the plurality of third mold portions 76 corresponding to one first mold portion 72.

Figure 5:
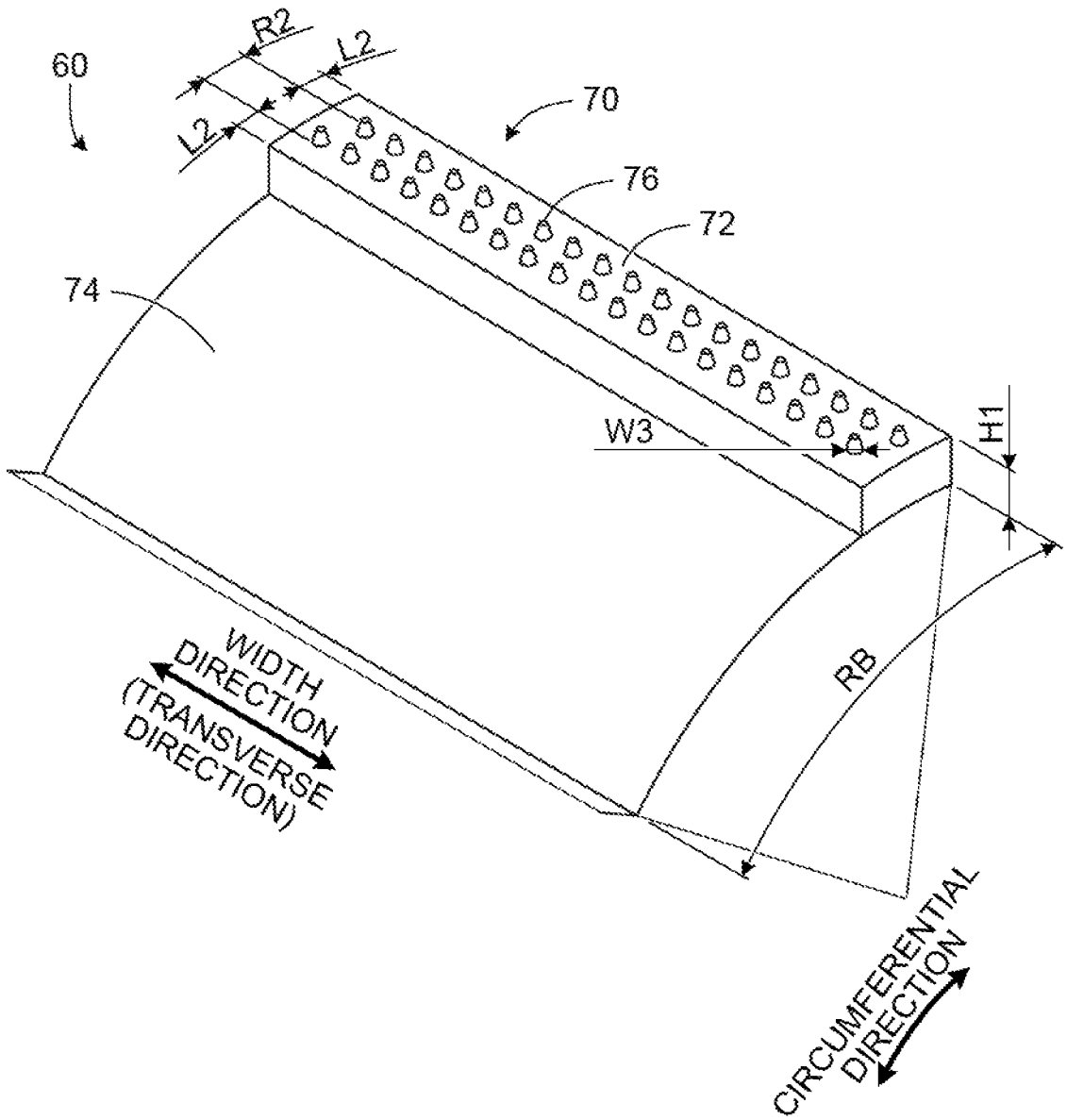
FIG. 5 is a partial perspective view showing an example of a schematic configuration of the emboss processing mold. A range of the emboss processing mold corresponding to a second reference region is shown.

When the bottom surface of the first concave portion 32 is a rectangular shape (see FIGS. 1 and 2), the first mold portion 72 is formed in a convex shape whose top surface is a rectangular shape corresponding to the bottom surface of the first concave portion 32 (see FIG. 5). Unlike this, it is assumed that the bottom surface of the first concave portion 32 is any one of the circular shape, the elliptical shape, the polygonal shape, the star shape and the flower shape exemplified above. In this case, the first mold portion 72 is formed in a convex shape whose top surface is any one of a circular shape, an elliptical shape, a polygonal shape, a star shape and a flower shape corresponding to the bottom surface of the first concave portion 32.

The first mold portion 72 is preferably a convex shape having an area of the top surface is 25 mm2 or more. Thus, the first concave portion 32 can be a concave portion having the third area of 25 mm2 or more. In the case of manufacturing the emboss processing mold 60, the formation of the third mold portion 76 becomes easy.

The first mold portion 72 is preferably 5 to 60% in area ratio with respect to a second reference region RB. The aforementioned area ratio corresponds to the area ratio of the first concave portion 32 with respect to the first reference region RA described above. The second reference region RB is a region formed by a pair of adjacent first mold portions 72 and second mold portions 74 (see FIG. 5). This makes it possible to set the first concave portion 32 to the area ratio of 5 to 60% with respect to the first reference region RA. By setting the area ratio of the first mold portion 72 with respect to the second reference region RB to 5% or more, the concavo-convex pattern 30 having a three-dimensional effect can be formed on the front surface of the base material 20. By setting the area ratio of the first mold portion 72 with respect to the second reference region RB to 60% or less, it is possible to form the convex part 34 having a height. As a result, the concavo-convex pattern 30 having a three-dimensional effect can be formed on the front surface of the base material 20.

Height H1 (see FIG. 5) of the first mold portion 72 is appropriately determined in consideration of various conditions. However, it is preferable that the first mold portion 72 has a convex shape in which the height H1 is set to a predetermined value in the range of 1 to 15 mm. By setting the height H1 to 1 mm or more, the concavo-convex pattern 30 having a three-dimensional effect can be formed on the front surface of the base material 20. By setting the height H1 to 15 mm or less, it is possible to ensure good processability in the emboss processing method implementation. It is possible to prevent the processing speed from being lowered. As a result, the productivity of the decorative sheet 10 can be enhanced.

When the opening end and the bottom surface of the second concave portion 36 are circular shapes (see FIGS. 1 and 2), the third mold portion 76 is formed in a convex shape in which the rear end and a top surface are in a circular shape corresponding to the opening end and the bottom surface of the second concave portion 36 (see FIG. 5). Unlike this, it is assumed that the opening end and the bottom surface of the second concave portion 36 are any of the elliptical shape, the polygonal shape, the star shape and the flower shape exemplified above. In this case, the third mold portion 76 is formed in a convex shape in which the rear end and the top surface are any one of an elliptical shape, a polygonal shape, a star shape and a flower shape corresponding to the opening end and the bottom surface of the second concave portion 36.

Height H2 (see FIG. 6) of the third mold portion 76 is preferably 50% or more and less than 100% with respect to the thickness T1 of the first sheet 22. As a result, the depth D2 of the second concave portion 36 can be set to 50% or more and less than 100% with respect to the thickness T1 of the first sheet 22. By setting the height H2 to 50% or more with respect to the thickness T1, it is possible to form the second concave portion 36 having a preferable visibility on the front surface of the base material 20 (the bottom surface of the first concave portion 32). By setting the height H2 to less than 100% with respect to the thickness T1, the bottom surface of the second concave portion 36 can be included in the first sheet 22.

Figure 6:
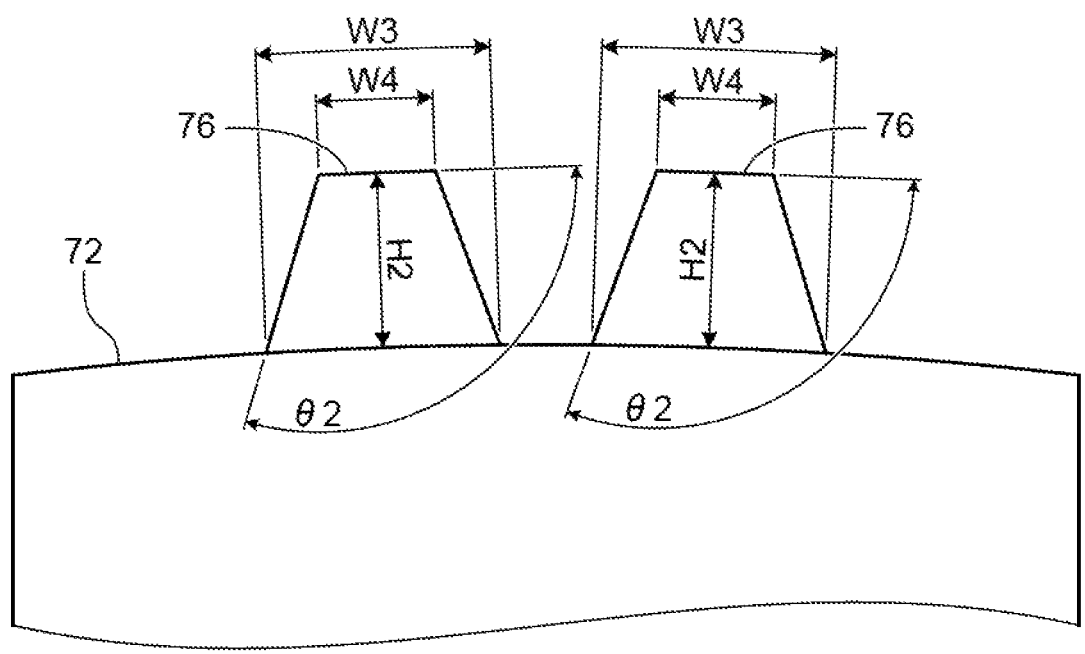
FIG. 6 is a side view showing an example of a schematic configuration of a third mold portion.

It is preferable that the third mold portion 76 has a convex shape in which the maximum dimension W3 is set to a predetermined value in the range of 0.5 to 2 mm (see FIG. 6). This makes it possible to make the second concave portion 36 to a concave portion in which the maximum dimension W1 is set to a predetermined value in the range of 0.5 to 2 mm. By setting the maximum dimension W3 to 0.5 mm or more, it is possible to form the second concave portion 36 having a preferable visibility. By setting the maximum dimension W3 to 2 mm or less, it is possible to form the concavo-convex pattern 30 having preferable design properties on the front surface of the base material 20. The third mold portion 76 may have a convex shape in which an area of the rear end of the third mold portion 76 is set to a predetermined value in the range of 0.19 to 3.2 mm2.

The third mold portion 76 is preferably provided in the second region R2 in a state in which a ratio of a fifth area to a sixth area is 5% or more and 35% or less. The sixth area is a sum of a fourth area and the fifth area. The fourth area is an area of the top surface of the first mold portion 72 excluding a non-exposed region. The non-exposed region is a region which is not exposed by the third mold portion 76 on the top surface of the first mold portion 72. The fifth area is an area of the non-exposed area. It is assumed that a number of N third mold portions 76 are provided on the top surface of one first mold portion 72. For one third mold portion 76, the area of the rear end of the third mold portion 76 is assumed to be M. In this case, the fifth area is a product of N and M. Each of the fourth area, the fifth area and the sixth area considers the top surface of one first mold portion 72. Thus, the second concave portion 36 can be provided in the first region R1 in a state in which the ratio of the second area to the third area is 5% or more and 35% or less. By setting the aforementioned ratio to 5% or more, it is possible to form the concavo-convex pattern 30 having preferable design properties on the front surface of the base material 20. By setting the aforementioned ratio to 35% or less, it is possible to form the second concave portion 36 having a sharp shape on the front surface of the base material 20.

The third mold portion 76 is preferably formed in a convex shape in which an angle θ2 is set to a predetermined value in the range of 90 to 120°. The angle θ2 is an angle between a side surface of the third mold portion 76 and the top surface of the third mold portion 76 (see FIG. 6). As a result, the second concave portion 36 can be a concave portion whose angle θ1 is set to a predetermined value in the range of 90 to 120°. By setting the angle θ2 at 90° or more, the corner portion E at the opening end of the second concave portion 36 can have a sharp shape. By setting the angle θ2 at 120° or less, the second concave portion 36 can be made to look like a through hole.

The third mold portion 76 is preferably formed in a convex shape in which a ratio of a maximum dimension W4 to the maximum dimension W3 is set to a predetermined value in the range of 30 to 80%. The maximum dimension W4 is a maximum dimension of the top surface of the third mold portion 76 in the following direction (see FIG. 6). The aforementioned direction is a direction along the top surface of the first mold portion 72, as like the maximum dimension W3. In the embodiment, since the second concave portion 36 is a truncated cone-shaped concave portion as described above, the top surface (tip end) of the third mold portion 76 has a circular shape. Therefore, the maximum dimension W4 is the diameter of the circle. Unlike this, when the second concave portion 36 is in the shape of an elliptical frustum, the maximum dimension W4 is the major diameter of the ellipse. When the second concave portion 36 is in the shape of a truncated quadrangular pyramid, the maximum dimension W4 is the dimension of the diagonal line which becomes longer among the two diagonal lines. As a result, the second concave portion 36 can be a concave portion in which the ratio of the maximum dimension W2 to the maximum dimension W1 is set to a predetermined value in the range of 30 to 80%. By setting the ratio of the maximum dimension W4 to the maximum dimension W3 to 30% or more, the corner portion E at the opening end of the second concave portion 36 can have a sharp shape. By setting the ratio of the maximum dimension W4 to the maximum dimension W3 to 80% or less, the second concave portion 36 can be made to look like a through hole.

The emboss receiving mold 80 rotates in a direction corresponding to the conveying direction with a shaft 82 as a rotation axis. The rotation direction of the emboss receiving mold 80 is opposite to the rotation direction of the emboss processing mold 60. The emboss receiving mold 80 is in contact with the back surface of the base material 20. In the emboss processing apparatus 50, the emboss processing mold 60 and the emboss receiving mold 80 sandwich the base material 20. The emboss receiving mold 80 rotates following the rotation of the emboss processing mold 60 in a state of being in contact with the back surface of the base material 20. The following arrow shown in FIG. 4 shows a rotation direction of the emboss receiving mold 80. The aforementioned arrow is an arrow of a single arrow indicated inside the emboss receiving mold 80. As the emboss receiving mold 80, an emboss receiving mold provided in a known emboss processing apparatus can be adopted. Therefore, other explanation on the emboss receiving mold 80 will be omitted.

The heating portion 90 is embedded in the emboss processing mold 60. The heating portion 90 heats the emboss processing mold 60 to a predetermined temperature. The heating portion 92 is embedded in the emboss receiving mold 80. The heating portion 92 heats the emboss receiving mold 80 to a predetermined temperature. The heating portions 90, 92 are electric heaters. In the embodiment, with respect to the emboss processing mold 60, four heating portions 90 formed by electric heaters are embedded therein at equiangular intervals and with respect to the emboss receiving mold 80, four heating portions 92 formed by electric heaters are embedded therein at equiangular intervals. However, the heating portions 90, 92 may be heating portions of a different type from that of the electric heater. The number of the heating portions 90 with respect to the emboss processing mold 60 may be three or less, or five or more. The number of the heating portions 92 with respect to the emboss receiving mold 80 may be three or less, or five or more. The type and number of the heating portions 90, 92 are appropriately determined in consideration of various conditions. The arrangement of the heating portions 90 in the emboss processing mold 60 is appropriately determined in consideration of various conditions. The arrangement of the heating portions 92 in the emboss receiving mold 80 is appropriately determined in consideration of various conditions.

The temperature of the emboss processing mold 60 heated by the heating portions 90 is appropriately set according to the type of the base material 20. For example, the aforementioned temperature is appropriately set in consideration of the material of either or both of the first sheet 22 and the second sheet 24. It is assumed that the first sheet 22 is polyethylene terephthalate. The melting point of polyethylene terephthalate is 260° C. In this case, the heating portions 90 heat the emboss processing mold 60 to a predetermined value in the range of 60 to 210° C. Preferably, the heating portions 90 heat the emboss processing mold 60 to a predetermined value in the range of 80 to 180° C. By setting the temperature of the emboss processing mold 60 to 60° C. or higher, a clear concavo-convex pattern 30 can be formed on the front surface of the base material 20. By setting the temperature of the emboss processing mold 60 to 210° C. or lower, the front surface quality of the first sheet 22 can be made preferable. As a result, the decorative sheet 10 with good texture can be obtained.

<Emboss Processing Method>

The emboss processing method will be described with reference to FIGS. 1 and 4. The emboss processing method is performed by the emboss processing apparatus 50. The emboss processing method includes a supplying process, an embossing process and a recovering process (see FIG. 4). By the emboss processing method, the decorative sheet 10 shown in the lower row of FIG. 1 is manufactured from the base material 20 shown in the upper row of FIG. 1. Therefore, the emboss processing method can be said to be a manufacturing method of the decorative sheet 10. In the emboss processing method, while continuously conveying the base material 20 in the conveying direction, the supplying process, the embossing process and the recovering process are successively carried out. The supplying process is carried out continuously with respect to the continuously conveyed base material 20. The embossing process is carried out continuously with respect to the continuously conveyed base material 20. The recovering process is carried out continuously with respect to the continuously conveyed base material 20. In the emboss processing apparatus 50, when the emboss processing method is carried out, the driving portion for the emboss processing mold 60 is continuously driven.

In the emboss processing method, by pressing the base material 20, the concavo-convex pattern 30 is formed on the front surface of the base material 20 (see FIG. 1). The heating portion 90 heats the emboss processing mold 60. The heating portion 92 heats the emboss receiving mold 80. The emboss processing method is carried out in a state in which the emboss processing mold 60 is heated to the above-described predetermined temperature and the emboss receiving mold 80 is heated to a predetermined temperature. The temperature of the emboss receiving mold 80 is appropriately set in consideration of various conditions. For example, in order to set the temperature of the emboss receiving mold 80, the three-dimensional effect of the concavo-convex pattern 30 and the texture of the decorative sheet 10 are taken into consideration. In the emboss processing apparatus 50, the heating portion 92 may be omitted. In this case, the emboss processing method is carried out in a state in which the emboss receiving mold 80 is not directly heated.

The supplying process is a process of supplying the base material 20 to the emboss processing apparatus 50 (see FIG. 4). That is, in the supplying process, the base material 20 is fed out from the supplying device 95. The base material 20 fed out from the supplying device 95 is conveyed in the conveying direction and reaches the emboss processing apparatus 50.

The embossing process is a process of forming the concavo-convex pattern 30 on the front surface of the base material 20 (see FIG. 4). In the embossing process, emboss processing is applied to the base material 20 that has reached the emboss processing apparatus 50. The embossing process includes a first concave portion process, a convex portion process, and a second concave portion process. The first concave portion process is a process of forming the first concave portions 32. The convex portion process is a process of forming the convex portions 34. The second concave portion process is a process of forming the second concave portions 36. In the second concave portion process, the second concave portions 36 are formed in the first regions R1 of the bottom surfaces of the first concave portions 32. The second concave portion process is carried out together with the first concave portion process. That is, the base material 20 conveyed in the conveying direction passes between the emboss processing mold 60 and the emboss receiving mold 80 during conveyance. At this time, the base material 20 is in contact with the outer surface of the emboss receiving mold 80 on the back surface and is supported by the emboss receiving mold 80 from the back side. The base material 20 is brought into contact with the molding portion 70 on the front surface and is pressed by the molding portion 70. The first mold portions 72 and the third mold portions 76 of the molding portion 70 bite into the base material 20. The base material 20 is heated by the heat from the emboss processing mold 60 heated by the heating portion 90. By the embossing process, the base material 20 is formed into the decorative sheet 10 (see FIG. 1). In the aspect shown in FIG. 4, the base material 20 is in contact with the second mold portions 74 during the embossing process. However, such an aspect is an example. During the embossing process, the base material 20 may not contact the second mold portions 74 in some cases.

The recovering process is a process of recovering the base material 20 that has passed through the emboss processing apparatus 50 (see FIG. 4). That is, in the recovering process, the decorative sheet 10 is recovered from the emboss processing apparatus 50 by the recovering device 96. In the decorative sheet 10 shown in the lower row of FIG. 1, the back surface has a concavo-convex shape corresponding to the first concave portion 32 and the convex portion 34 on the front surface. However, even in the following case, unlike the lower row of FIG. 1, a back surface of a decorative sheet may not have a concavo-convex shape corresponding to a concavo-convex pattern of a front surface. The aforementioned case is case where the emboss processing method is performed in the emboss processing apparatus 50 in the same manner as above. Whether the back surface of the decorative sheet becomes concavo-convex shaped (see the lower row of FIG. 1) or flat shaped (not shown), it is determined by the characteristics of the base material 20. The characteristics of the base material 20 means the characteristics of some or all of the characteristics of the respective materials of the first sheet 22, the second sheet 24 and the third sheet 26. For example, when the third sheet 26 is made of a material having the following characteristics, the decorative sheet may not have the concavo-convex shape on the back surface. The aforementioned characteristics are the characteristics that it is difficult to stretch and that thermal shrinkage is large. In the case where the outer surface of the emboss receiving mold 80 is a flat curved surface, as like the decorative sheet 10 shown in the lower row of FIG. 1, the point that the back surface of the base material 20 is deformed into a concavo-convex shape is a known event. For example, the aforementioned point is described in Japanese Patent No. 5913755 described above.

In the emboss processing method, a conveying speed of the base material 20 is preferably set to a predetermined value in the range of 0.1 to 10 m/min. Preferably, the conveying speed of the base material 20 is set to a predetermined value in the range of 0.3 to 5 m/min.

In the embossing process, a pressing time of the base material 20 is preferably set to a predetermined value in the range of 0.01 to 5 seconds. Preferably, the pressing time of the base material 20 is set to a predetermined value in the range of 0.1 to 2 seconds. By setting the pressing time of the base material 20 to 0.01 second or more, it is possible to appropriately apply a pressing force to the base material 20 when the base material 20 passes between the emboss processing mold 60 and the emboss receiving mold 80. It is possible to form a sufficient concavo-convex pattern 30 on the front surface of the base material 20. By setting the pressing time of the base material 20 to 5 seconds or less, the decorative sheet 10 with good texture can be manufactured. Productivity can be improved.

In the embossing process, the pressing force to the base material 20 is preferably set to a predetermined value in the range of 0.7 to 7 kgf/cm2. Preferably, the pressing force to the base material 20 is set to a predetermined value in the range of 1.4 to 3.5 kgf/cm2. By setting the pressing force to the base material 20 to 0.7 kgf/cm2 or more, it is possible to appropriately apply the pressing force to the base material 20 when the base material 20 passes between the emboss processing mold 60 and the emboss receiving mold 80. It is possible to form a sufficient concavo-convex pattern 30 on the surface of the base material 20. By setting the pressing force to the base material 20 to 7 kgf/cm2 or less, the decorative sheet 10 with a good texture can be manufactured. Productivity can be improved.

Example

The inventor conducted experiments to confirm the effectiveness of the emboss process method and the emboss processing mold 60 of the emboss processing apparatus 50 of the embodiment. The experimental results obtained by the experiments will be described below. At that time, in order to clarify the correspondence with the above, the reference numerals for each part are the same as above. However, the emboss processing apparatus 50 is referred to as "emboss processing apparatuses 51, 52, 53".

(1) Experimental Method

In the experiments, Samples 1, 2, and 3 were evaluated. Sample 1 was produced by the emboss processing apparatus 51. Sample 2 was produced by the emboss processing apparatus 52. Sample 3 was produced by the emboss processing apparatus 53. Samples 1, 2, and 3 correspond to the decorative sheet 10. The concavo-convex pattern 30 was a concavo-convex pattern (stripe pattern) in which a plurality of first concave portions 32 and a plurality of convex portions 34 were alternately repeated in the longitudinal direction (see the lower row of FIG. 1).

For producing Samples 1, 2 and 3, the same base material 20 was used. In Samples 1, 2, and 3, as described above, the base material 20 was a three-layer laminate body (see the upper row of FIG. 1). The configurations of the first sheet 22, the second sheet 24 and the third sheet 26 were as follows. The first sheet 22, the second sheet 24 and the third sheet 26 were laminated by frame laminating.

(Base Material 20)

First sheet 22 (material, thickness T1): Synthetic leather (laminate polyurethane resin layer on tricot knitted fabric), 1 mm Second sheet 24 (material, thickness T2): Flexible polyurethane foam sheet (INOAC CORPORATION, trade name of product: EL67), 5 mm Third sheet 26 (material, basis weight): Nonwoven fabric (polyester nonwoven fabric), 40 g/m2

The emboss processing apparatuses 51, 52, 53 are emboss processing apparatuses corresponding to the emboss processing apparatus 50. The difference between the emboss processing apparatuses 51, 52, 53 is the emboss processing mold 60. In the emboss processing apparatuses 51, 52, 53, the emboss processing mold 60 and the emboss receiving mold 80 both have roll shapes (see FIG. 4). The specifications of the emboss processing molds 60 of the emboss processing apparatuses 51, 52, 53 and the processing conditions of the emboss processing method at the time of producing the Samples 1, 2, 3 are as follows: regarding the specification of the emboss processing mold 60, the emboss processing apparatus 51 is used as a reference. In this case, the point that the emboss processing molds 60 of the emboss processing apparatuses 52, 53 are different from the emboss processing mold 60 of the emboss processing apparatus 51 is the "specification of the third mold portion 76". Therefore, regarding the emboss processing molds 60 of the emboss processing apparatuses 52, 53, the description of "the specification of the first mold portion 72" is omitted. Each shape of the first mold portion 72 and the third mold portion 76 correspond to the shapes when the following first mold portions 72 and the following third mold portions 76 shown in FIG. 4 are respectively viewed from directly in front of the drawing in a state in which the viewing direction is "Z2 direction" shown in FIG. 4. The aforementioned first mold portion 72 is the first mold portion 72 shown in FIG. 4 in a state of biting into the base material 20 on the second side in the arrangement direction. The aforementioned third mold portions 76 are each third mold portion 76 shown on the top surface of the aforementioned first mold portion 72. The processing conditions of the emboss processing method at the time of producing Samples 1, 2, and 3 were the same. In the emboss processing mold 60, a width direction coincides with the direction of the axis of the shaft 62. The width direction is a direction perpendicular to the paper showing FIG. 4 and coincides with the transvers direction of the base material 20.

(Emboss Processing Mold 60 of Emboss Processing Apparatus 51)
Specification of First Mold Portion 72
Shape: Rectangular
Dimensions (top surface, height H1): 9 mm×1500 mm (circumferential direction×width direction), 10 mm
Area of the top surface (sixth area): 13500 mm$^2$
Ratio of the first mold portion 72 to the second reference region RB: 25%
Specification of Third Mold Portion 76
Shape: Circular
Dimensions (maximum dimensions W3, W4, height H2): 1 mm, 0.5 mm, 0.7 mm
Angle θ2: 104°
Ratio of the maximum dimension W4 to the maximum dimension W3: 50%
Ratio of the fifth area to the sixth area: 32%
(Emboss Processing Mold 60 of Emboss Processing Apparatus 52)
Specification of Third Mold Portion 76
Shape: Circular
Dimensions (maximum dimensions W3, W4, height H2): 1 mm, 0.1 mm, 0.7 mm
Angle θ2: 114°
Ratio of the maximum dimension W4 to the maximum dimension W3: 10%
Ratio of the fifth area to the sixth area: 32%
(Emboss Processing Mold 60 of Emboss Processing Apparatus 53)
Specification of Third Mold Portion 76
Shape: Circular
Dimensions (maximum dimensions W3, W4, height H2): 1 mm, 1 mm, 0.7 mm
Angle θ2: 90°
Ratio of the maximum dimension W4 to the maximum dimension W3: 100%
Ratio of the fifth area to the sixth area: 32%
(Processing Condition of Emboss Processing Method (common))
Surface temperature of the emboss processing mold 60: 180° C.
Surface temperature of the emboss receiving mold 80: 230° C.
Conveying speed: 2 m/min
Pressing force: 1.4 kgf/cm$^2$ (2) Evaluation
Regarding the Samples 1, 2, and 3, the concavo-convex pattern 30 formed on the front surface of the base material 20 was as follows. Each shape of the first concave portion 32 and the second concave portion 36 correspond to the shapes when the first concave portion 32 and the second concave portion 36 to be evaluated are respectively viewed from directly in front in a state in which the viewing direction is "Z1 direction" shown in the lower row of FIG. 1.

(Sample 1)
Configuration of First Concave Portion 32
Shape: Rectangular
Dimensions (bottom surface, depth D1): 9 mm×1500 mm (longitudinal direction×transverse direction), 10 mm
Area of the bottom surface (third area): 13500 mm$^2$
Ratio of the first concave portion 32 to the first reference region RA: 25%
Configuration of Second Concave Portion 36
Shape: Circular
Dimensions (maximum dimension W1, W2, depth D2): 1 mm, 0.5 mm, 0.7 mm
Angle θ1: 104°
Ratio of the maximum dimension W2 to the maximum dimension W1: 50%
Ratio of the second area to the third area: 32%
(Sample 2)
Configuration of First Concave Portion 32
Shape: Rectangular
Dimensions (bottom surface, depth D1): 9 mm×1500 mm (longitudinal direction×transverse direction), 10 mm
Area of the bottom surface (third area): 13500 mm$^2$
Ratio of the first concave portion 32 to the first reference region RA: 25%
Configuration of Second Concave Portion 36
Shape: Circular
Dimensions (maximum dimension W1, W2, depth D2): 1 mm, 0.1 mm, 0.7 mm
Angle θ1: 114°
Ratio of the maximum dimension W2 to the maximum dimension W1: 10%
Ratio of the second area to the third area: 32%
(Sample 3)
Configuration of First Concave Portion 32
Shape: Rectangular
Dimensions (bottom surface, depth D1): 9 mm×1500 mm (longitudinal direction×transverse direction), 10 mm
Area of the bottom surface (third area): 13500 mm$^2$
Ratio of the first concave portion 32 to the first reference region RA: 25%
Configuration of Second Concave Portion 36
Shape: Circular
Dimensions (maximum dimension W1, W2, depth D2): 1 mm, 1 mm, 0.7 mm
Angle θ1: 90°
Ratio of the maximum dimension W2 to the maximum dimension W1: 100%
Ratio of the second area to the third area: 32%

In the present experiments, sensory evaluation was performed on the aspect of the second concave portion 36 according to the following evaluation criteria. As a result, in Sample 1, the evaluation was "A". In Samples 2 and 3, the evaluation was "B". That is, in the present experiments, good results were obtained for any of Samples 1 to 3. This confirmed the effectiveness of the emboss processing method and the emboss processing mold 60 of the embodiment.

[Evaluation Criteria]
A: It satisfies the following conditions 1 to 3
Condition 1: the corner portions E of the second concave portions 36 are good and sharp
Condition 2: the second concave portions 36 have a shape along the thickness direction
Condition 3: The second concave portions 36 look like through holes, and it can be visually recognized that a pattern in which a plurality of through holes are arranged on the bottom surfaces of the first concave portions 32 is provided B: It satisfies the above condition 1

C: Neither of the above conditions 1 to 3 are satisfied and the second concave portions 36 are somewhat obscure D: Neither of the above conditions 1 to 3 are satisfied and the second concave portions 36 are unclear <Effect of Embodiment>

According to the embodiment, the following effects can be obtained.

(1) The decorative sheet 10 includes the base material 20 and the concavo-convex pattern 30 (see the lower row of FIG. 1). The concavo-convex pattern 30 is provided on the front surface of the base material 20. The base material 20 includes the first sheet 22 and the second sheet 24 and further includes the third sheet 26. In the base material 20, the first sheet 22, the second sheet 24 and the third sheet 26 are laminated. The concavo-convex pattern 30 includes the first concave portions 32, the convex portions 34 and the second concave portions 36. The second concave portion 36 are provided in the first regions R1 of the bottom surfaces of the first concave portions 32 (see FIG. 2). Therefore, the visibility of the second concave portions 36 provided on the bottom surfaces of the first concave portions 32 can be improved. The viewer of the decorative sheet 10 can visually recognize the second concave portions 36 from the obliquely upper side of the front side of the decorative sheet 10. For example, in the decorative sheet 10 shown in the lower row of FIG. 1, all of the plurality of second concave portions 36 provided on the bottom surfaces of all of the first concave portions 32 can be visually recognized.

(2) In the decorative sheet 10, the second concave portions 36 are provided on the first sheet 22 in a state that the bottom surface is included in the first sheet 22 (see FIG. 3). Therefore, the second sheet 24 can be covered with the first sheet 22. The second sheet 24 cannot be visually recognized from the front side of the decorative sheet 10. Exposure of the second sheet 24 on the front surface of the decorative sheet 10 can be prevented.

<Modifications>

The embodiment can also be configured as follows. Some configurations of modifications illustrated below may also be employed in combination as appropriate. In the following description, points different from the above description are described, and the description of similar points is omitted as appropriate.

(1) The concavo-convex pattern 30 includes a plurality of second concave portions 36 on the bottom surface of the first concave portion 32 (see the lower row of FIG. 1 and FIG. 2). In the decorative sheet, the concavo-convex pattern may be a pattern in which the number of the second concave portion with respect to one first concave portion is one. In this case, in the emboss processing mold, one third mold portion is provided on the top surface of the first mold portion. The opening region at the bottom surface of the first concave portion is equivalent to one second concave portion. The second area is an area of the region where one second concave portion opens at the bottom surface of the first concave portion. The non-exposed region on the top surface of the first mold portion is equivalent to one third mold portion. The fifth area is an area of the non-exposed region by one third mold portion on the top surface of the first mold portion.

Figure 7:
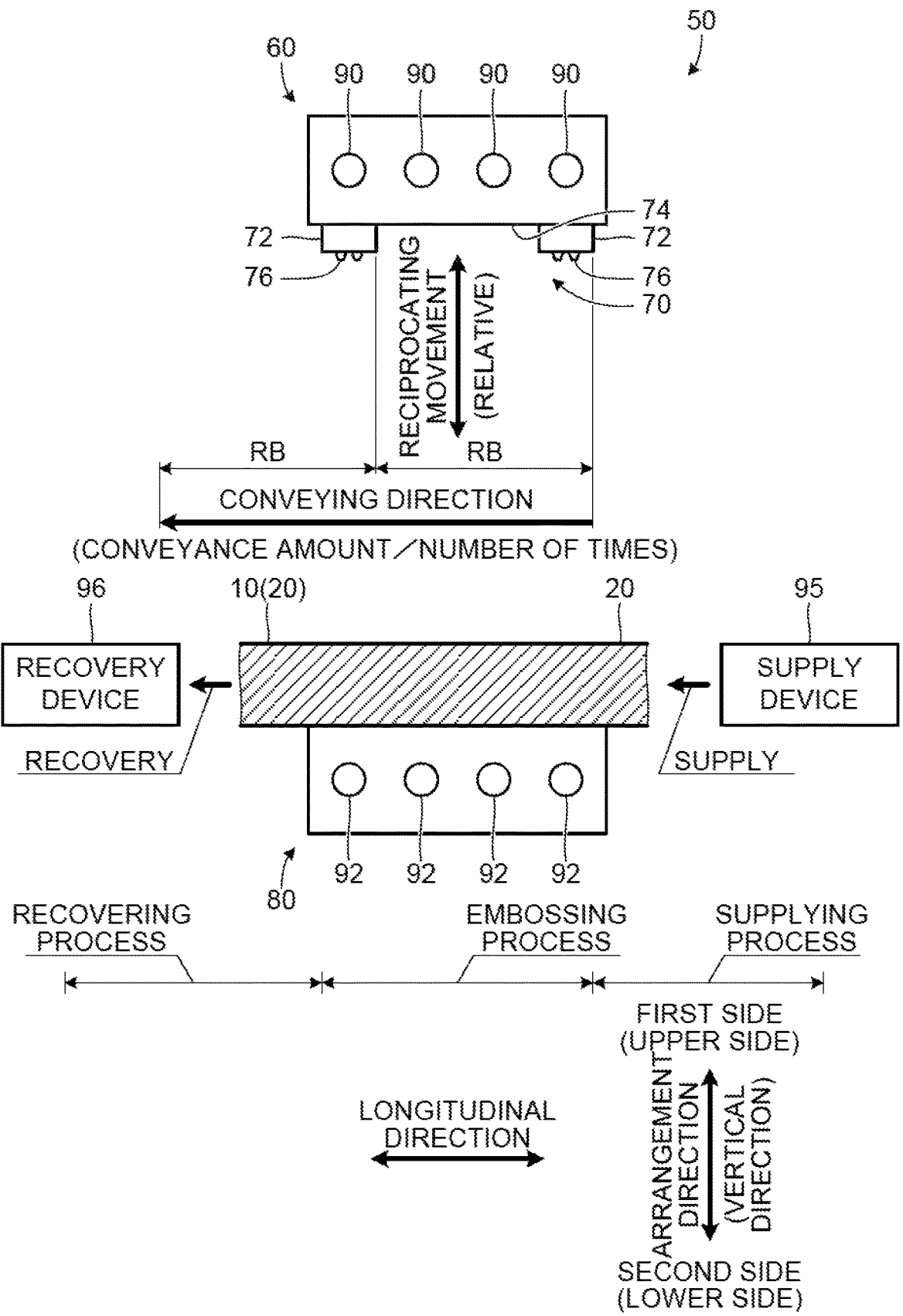
FIG. 7 is a side view showing another example of a schematic configuration of an emboss processing apparatus. An emboss processing mold and an emboss receiving mold have flat plate shapes. The emboss processing mold is shown in a moved state to a first side in an arrangement direction with respect to the emboss receiving mold. A base material and a decorative sheet show portions corresponding to the emboss processing apparatus.

(2) In the emboss processing apparatus 50, the emboss processing mold 60 and the emboss receiving mold 80 have roll shapes and are rotatably supported in a direction corresponding to the conveying direction (see FIG. 4). The emboss processing mold and the emboss receiving mold may have shapes different from the roll shape. For example, as shown in FIG. 7, an emboss processing mold 60 and an emboss receiving mold 80 may have flat plate shapes. In FIG. 7, in order to clarify the correspondence with FIG. 4, the reference numerals with respect to each part are the same as those described above.

In an emboss processing method performed by an emboss processing apparatus 50 shown in FIG. 7, the emboss processing mold 60 relatively reciprocates with respect to the emboss receiving mold 80. In this relative reciprocating movement, a movement from a first side to a second side in an arrangement direction and a movement from the second side to the first side in the arrangement direction are repeated. A base material 20 is intermittently conveyed in a conveying direction in a state in which the emboss processing mold 60 has moved to the first side in the arrangement direction with respect to the emboss receiving mold 80. An amount of conveyance per time is set to an amount that is a multiple number of an installation number of a dimension of a second reference region RB in a longitudinal direction. The installation number corresponds to a number of first mold portions 72 provided in a molding portion 70. For example, as in the emboss processing apparatus 50 shown in FIG. 7, it is assumed that the emboss processing mold 60 is provided with two first mold portions 72. In this case, the installation number is "2". Therefore, the amount of conveyance at one time is twice the dimension of the second reference region RB in the longitudinal direction. A conveying speed of the base material 20 is preferably set to a predetermined value in the range of 0.5 to 6 m/min. Preferably, the conveying speed of the base material 20 is set to a predetermined value in the range of 0.6 to 3 m/min.

The emboss processing mold 60 is provided with heating portions 90. The emboss receiving mold 80 is provided with heating portions 92. When the emboss processing method is carried out, the heating portions 90 heat the emboss processing mold 60 and the heating portions 92 heat the emboss receiving mold 80. However, for example, in the emboss receiving mold 80, the heating portions 92 may be omitted. In a state in which the emboss processing mold 60 has moved to the second side in the arrangement direction, the base material 20 is sandwiched between the emboss processing mold 60 and the emboss receiving mold 80. The base material 20 is in contact with an outer surface of the emboss receiving mold 80 on a back surface and is supported by the emboss receiving mold 80 from a back side. The base material 20 is brought into contact with the molding portion 70 on a front surface and is pressed by the molding portion 70. The first mold portions 72 and third mold portions 76 of the molding portion 70 bite into the base material 20. Along with this, a concavo-convex pattern 30 is formed on the front surface of the base material 20 in the same manner as described above. A pressing time of the base material 20 is preferably set to a predetermined value in the range of 30 to 120 seconds. Preferably, the pressing time of the base material 20 is set to a predetermined value in the range of 50 to 90 seconds. The same effect as described above can be obtained.

The relative movement between the emboss processing mold 60 and the emboss receiving mold 80 preferably carried out such that the emboss processing mold 60 is reciprocated in the arrangement direction with the position of the emboss receiving mold 80 being fixed (see FIG. 7). However, relative movement between the emboss processing mold 60 and the emboss receiving mold 80 may be different from this aspect. For example, the relative movement between the emboss processing mold 60 and the emboss receiving mold 80 may be carried out by reciprocating the emboss processing mold 60 and the emboss receiving mold 80 respectively in the arrangement direction. In the emboss processing apparatus, the emboss processing mold and the emboss receiving mold may be, for example, as follows. That is, the emboss processing apparatus may be provided with the roll-shaped emboss processing mold 60 shown in FIG. 4 and the flat-plate-shaped emboss receiving mold 80 shown in FIG. 7.

(3) As a processing target of the emboss processing method by the emboss processing apparatus 50, the base material 20 which is a three-layer laminate body was exemplified (see the upper row of FIG. 1). Further, it was explained that a two-layer laminate body or a laminate body of four or more layers can be adopted as the base material. The base material may be a single layer sheet material which is not a laminate body. That is, the base material may be a thick sheet material having cushioning properties.

The invention claimed is:

1. A decorative sheet comprising:
 a base material including a first sheet which forms a front surface of the base material and a second sheet which has a cushioning property and which laminates with the first sheet; and
 a concavo-convex pattern provided on the front surface of the base material, wherein the concavo-convex pattern includes:
 a first concave portion having a first region and a second region, the first concave portion including a first bottom surface that extends throughout the second region and is planar throughout the second region, the first bottom surface having depth direction that coincides with a thickness direction of the base material;
 a convex portion which abuts the second region of the first concave portion such that the second region separates the convex portion from the first region, the convex portion having a height direction that coincides with the thickness direction;
 a second concave portion having a second bottom surface, the second concave portion abutting with a first edge of the first bottom surface of the first concave portion and whose depth direction coincides with the thickness direction, the first edge entirely enclosing the second concave portion therein, wherein the second concave portion is provided on the first sheet in a state in which the second bottom surface of the second concave portion is included in the first sheet; and
 a third concave portion having a third bottom surface, the third concave portion abutting with a second edge of the first bottom surface of the first concave portion and whose depth direction coincides with the thickness direction, the second edge entirely enclosing the third concave portion therein,
 wherein the second concave portion and the third concave portion are provided in the first region within the first bottom surface of the first concave portion, the first region being spaced apart from a boundary between the first concave portion and the convex portion not less than a first maximum dimension of the second concave portion measured in a direction orthogonal to the thickness direction at an open end of the second concave portion,
 wherein the second concave portion is spaced apart from the third concave portion along an axis aligned with the boundary between the first concave portion and the convex portion, and
 wherein the first sheet has a first thickness in at least part of the first region that is less than a second thickness of the first sheet in the second region adjacent to the first region.

2. The decorative sheet of claim 1, wherein the first maximum dimension of the second concave portion is in a range of 0.5 mm or more to 2 mm or less.

3. The decorative sheet of claim 1, wherein the second concave portion is provided in the first region such that a ratio of a second area to a third area is in a range of 5% or more to 35% or less,
 wherein a first area is an area of the first bottom surface of the first concave portion excluding open regions enclosed by the first edge and the second edge,
 wherein the second area includes an area enclosed by the first edge and an area enclosed by the second edge, and
 wherein the third area is a sum of the first area and the second area.

4. The decorative sheet of claim 2, wherein the second concave portion is provided in the first region such that a ratio of a second area to a third area is in a range of 5% or more to 35% or less,
 wherein a first area is an area of the first bottom surface of the first concave portion excluding open regions enclosed by the first edge and the second edge,
 wherein the second area includes an area enclosed by the first edge and an area enclosed by the second edge, and
 wherein the third area is a sum of the first area and the second area.

5. The decorative sheet of claim 1, wherein the second concave portion is a concave portion in which an angle formed by a wall surface of the second concave portion and the second bottom surface of the second concave portion is in a range of 90° or more to 120° or less.

6. The decorative sheet of claim 2, wherein the second concave portion is a concave portion in which an angle formed by a wall surface of the second concave portion and the second bottom surface of the second concave portion is in a range of 90° or more to 120° or less.

7. The decorative sheet of claim 3, wherein the second concave portion is a concave portion in which an angle formed by a wall surface of the second concave portion and the second bottom surface of the second concave portion is in a range of 90° or more to 120° or less.

8. The decorative sheet of claim 1, wherein the second concave portion has a second maximum dimension along the second bottom surface of the second concave portion that is 30% or more to 80% or less of the first maximum dimension of the second concave portion.

9. The decorative sheet of claim 2, wherein the second concave portion has a second maximum dimension along the second bottom surface of the second concave portion that is 30% or more to 80% or less of the first maximum dimension of the second concave portion.

10. The decorative sheet of claim 3, wherein the second concave portion has a second maximum dimension along the second bottom surface of the second concave portion that is 30% or more to 80% or less of the first maximum dimension of the second concave portion.

11. An emboss processing method comprising:
 an embossing process which forms a concavo-convex pattern to a front surface of a base material, the base material including a first sheet which forms the front surface of the base material and a second sheet which has a cushioning property and which laminates with the first sheet, wherein the embossing process includes:
a first concave portion process which forms a first concave portion included in the concavo-convex pattern, the first concave portion having a first region and a second region and the first concave portion including a first bottom surface that extends throughout the second region and is planar throughout the second region;
a convex portion process which forms a convex portion included in the concavo-convex pattern, the convex portion abutting the second region of the first concave portion such that the second region separates the convex portion from the first region;
a second concave portion process which forms a second concave portion included in the concavo-convex pattern, the second concave portion having a second bottom surface and the second concave portion abutting with a first edge of the first bottom surface of the first concave portion, the first edge entirely enclosing the second concave portion therein, wherein the second concave portion is provided on the first sheet in a state in which the second bottom surface of the second concave portion is included in the first sheet; and
a third concave portion process which forms a third concave portion included in the concavo-convex pattern, the third concave portion having a third bottom surface and the third concave portion abutting with a second edge of the first bottom surface of the first concave portion, the second edge entirely enclosing the third concave portion therein,
wherein the first concave portion, the second concave portion and the third concave portion each have a depth direction that coincides with a thickness direction of the base material and the convex portion has a height direction that coincides with the thickness direction,
wherein the first, second and third concave portions are formed such that the first sheet has a first thickness in at least part of the first region that is less than a second thickness of the first sheet in the second region adjacent to the first region,
wherein the second and third concave portion processes are processes to form the second concave portion and the third concave portion in the first region within the first bottom surface of the first concave portion, the first region being spaced apart from a boundary between the first concave portion and the convex portion not less than a first maximum dimension of the second concave portion measured in a direction orthogonal to the thickness direction at an open end of the second concave portion,
wherein the second concave portion is spaced apart from the third concave portion along an axis aligned with the boundary between the first concave portion and the convex portion, and
wherein the second concave portion process is carried out together with the first concave portion process.

12. An emboss processing mold comprising:
a molding portion which contacts a front surface of a base material and has a concavo-convex shape which corresponds to a concavo-convex pattern which is formed on the front surface of the base material, the base material including a first sheet which forms the front surface of the base material and a second sheet which has a cushioning property and which laminates with the first sheet, wherein the molding portion includes:
a first mold portion having a first convex shape which corresponds to a first concave portion included in the concavo-convex pattern, the first concave portion having a first region and a second region and the first concave portion having a first bottom surface that extends throughout the second region and is planar throughout the second region;
a second mold portion having a concave shape which corresponds to a convex portion included in the concavo-convex pattern, the convex portion abutting the second region of the first concave portion such that the second region separates the convex portion from the first region; and
a third mold portion having a second convex shape which corresponds to a second concave portion and a third convex shape which corresponds to a third concave portion, the second and third concave portions included in the concavo-convex pattern,
wherein the second concave portion has a second bottom surface and the second concave portion abuts a first edge of the first bottom surface, the first edge entirely enclosing the second concave portion therein, and the second concave portion being provided on the first sheet in a state in which the second bottom surface of the second concave portion is included in the first sheet, and
wherein the third concave portion has a third bottom surface and the third concave portion abuts a second edge of the first bottom surface, the second edge entirely enclosing the third concave portion therein,
wherein the first concave portion, the second concave portion and the third concave portion each have a depth direction that coincides with a thickness direction of the base material and the convex portion has a height direction that coincides with the thickness direction,
wherein the third mold portion is provided in a third region of a top surface of the first mold portion, the third region being spaced apart from an outer edge of the top surface of the first mold portion corresponding to a boundary between the first concave portion and the convex portion not less than a first maximum dimension of the third mold portion measured along the top surface such that the third region corresponds to the first region,
wherein the second convex shape is spaced apart from the third convex shape along an axis aligned with the outer edge of the top surface, and
wherein the first mold portion and the third mold portion contact the base material such that the first sheet has a first thickness in at least part of the first region and a second thickness in the second region adjacent to the first region, the first thickness being less than the second thickness.

* * * * *